(12) United States Patent
Chong et al.

(10) Patent No.: US 9,008,170 B2
(45) Date of Patent: Apr. 14, 2015

(54) OFFSET TYPE AND COEFFICIENTS SIGNALING METHOD FOR SAMPLE ADAPTIVE OFFSET

(75) Inventors: In Suk Chong, San Diego, CA (US); Geert Van der Auwera, San Diego, CA (US); Marta Karczewicz, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 734 days.

(21) Appl. No.: 13/295,776

(22) Filed: Nov. 14, 2011

(65) Prior Publication Data

US 2012/0287988 A1 Nov. 15, 2012

Related U.S. Application Data

(60) Provisional application No. 61/484,624, filed on May 10, 2011, provisional application No. 61/503,454, filed on Jun. 30, 2011.

(51) Int. Cl.
| | |
|---|---|
| *H04N 19/105* | (2014.01) |
| *H04N 19/463* | (2014.01) |
| *H04N 19/117* | (2014.01) |
| *H04N 19/167* | (2014.01) |
| *H04N 19/196* | (2014.01) |
| *H04N 19/70* | (2014.01) |

(52) U.S. Cl.
CPC ... *H04N 19/00024* (2013.01); *H04N 19/00551* (2013.01); *H04N 19/00066* (2013.01); *H04N 19/00248* (2013.01); *H04N 19/00369* (2013.01); *H04N 19/00884* (2013.01)

(58) Field of Classification Search
CPC ............ H04N 19/00066; H04N 19/0055
See application file for complete search history.

(56) References Cited

U.S. PATENT DOCUMENTS

| | | | |
|---|---|---|---|
| 2005/0123207 A1* | 6/2005 | Marpe et al. | 382/239 |
| 2008/0013623 A1 | 1/2008 | Wang et al. | |
| 2008/0165855 A1 | 7/2008 | Wang et al. | |

(Continued)

FOREIGN PATENT DOCUMENTS

EP 2237557 A1 10/2010

OTHER PUBLICATIONS

Fu et al, "CE13: Sample Adaptive Offset with LCU-Independent Decoding", JCT-VC Contribution, E049, Geneva, Mar. 2011, pp. 8.

(Continued)

*Primary Examiner* — Christopher S Kelley
*Assistant Examiner* — Asmamaw G Tarko
(74) *Attorney, Agent, or Firm* — Shumaker & Sieffert, P.A.

(57) ABSTRACT

This disclosure describes techniques for performing sample adaptive offset signaling and coding in a video coding process. Techniques of the disclosure include both a merge-based and prediction-based signaling process for sample adaptive offset information (i.e., offset values and offset type). The techniques includes determining offset information for a current partition, comparing the offset information of the current partition with offset information of one or more neighbor partitions, coding a merge instruction in the case that the offset information of one of the one or more neighbor partitions is the same as the offset information of the current partition, and coding one of a plurality of prediction instructions in the case that the offset information of the one or more neighbor partitions is not the same as the offset information of the current partition.

85 Claims, 11 Drawing Sheets

(56) References Cited

U.S. PATENT DOCUMENTS

| | | | |
|---|---|---|---|
| 2009/0003718 | A1 | 1/2009 | Liu et al. |
| 2009/0010340 | A1 | 1/2009 | Joung et al. |
| 2009/0089549 | A1* | 4/2009 | Liu et al. .................. 712/208 |
| 2009/0257670 | A1* | 10/2009 | Chiu et al. ................. 382/239 |
| 2010/0074332 | A1 | 3/2010 | Karczewicz et al. |
| 2013/0208810 | A1* | 8/2013 | Shen et al. ............ 375/240.26 |
| 2014/0219337 | A1* | 8/2014 | Lee et al. ............... 375/240.02 |

OTHER PUBLICATIONS

Bross et al., "WD4: Working Draft 4 of High-Efficiency Video Coding," 6th Meeting: JCTVC-F803_d2, Torino, IT, Jul. 14-22, 2011, 226 pp.

Chen et al., "CE8 Subset2: A Joint Proposal on Improving the Adaptive Loop Filter in TMuC0.9 by MediaTek, Qualcomm, and Toshiba," Document JCTVC-D119, 4th Meeting: Daegu, KR, Jan. 20-28, 2011, 18 pp.

Fu et al., "CE8 Subset3: Picture Quadtree Adaptive Offset," Document JCTVC-D122, 4th Meeting: Daegu, KR, Jan. 20-18, 2011, 10 pp.

International Search Report and Written Opinion—PCT/US2012/036562—ISA/EPO—Jan. 23, 2013, 11 pp.

ITU-T H.264, Series H: Audiovisual and Multimedia Systems, Infrastructure of audiovisual services—Coding of moving video, Advanced video coding for generic audiovisual services, The International Telecommunication Union. Jun. 2011, 674 pp.

Wiegand et al., "WD1: Working Draft 1 of High-Efficiency Video Coding", JCTVC-C403, 3rd Meeting: Guangzhou, CN, Oct. 7-15, 2010, 137 pp.

Wiegand et al., "WD2: Working Draft 2 of High-Efficiency Video Coding," JCTVC-D503, 4th Meeting: Daegu, KR, Jan. 20-28, 2011, 153 pp.

Wiegand et al., "WD3: Working Draft 3 of High-Efficiency Video Coding," Document JCTVC-E603, 5th Meeting: Geneva, CH, Mar. 16-23, 2011, 193 pp.

International Preliminary Report on Patentability from international application No. PCT/US2012/036562, dated May 28, 2013, 7 pp.

First Action Interview Pilot Program Pre-Interview Communication from corresponding U.S. Appl. No. 14/270,155 dated Jul. 7, 2014 (4 pages).

European Office Action from European Application No. 12 720 760.3-1908, dated Apr. 11, 2014, 6 pp.

European Office Action from corresponding European Application No. 12720760.3 dated Nov. 13, 2014 (5 pages).

Australian Office from corresponding Australian Application No. 2012253847 dated Nov. 24, 2014 (3 pages).

* cited by examiner

SAO_EO_0

SAO_EO_1

SAO_EO_2

SAO_EO_3

FIG. 2

OFFSET TYPE AND COEFFICIENTS SIGNALING METHOD FOR SAMPLE ADAPTIVE OFFSET

This application claims the benefit of U.S. Provisional Application No. 61/484,624, filed May 10, 2011, and U.S. Provisional Application No. 61/503,454, filed Jun. 30, 2011, both of which are hereby incorporated by reference in their entirety.

TECHNICAL FIELD

This disclosure relates to video coding, and more particularly to techniques for performing sample adaptive offset signaling and coding in a video coding process.

BACKGROUND

Digital video capabilities can be incorporated into a wide range of devices, including digital televisions, digital direct broadcast systems, wireless broadcast systems, personal digital assistants (PDAs), laptop or desktop computers, digital cameras, digital recording devices, digital media players, video gaming devices, video game consoles, cellular or satellite radio telephones, video teleconferencing devices, and the like. Digital video devices implement video compression techniques, such as those described in the standards defined by MPEG-2, MPEG-4, ITU-T H.263, ITU-T H.264/MPEG-4, Part 10, Advanced Video Coding (AVC), the High Efficiency Video Coding (HEVC) standard presently under development, and extensions of such standards, to transmit, receive and store digital video information more efficiently.

Video compression techniques include spatial prediction and/or temporal prediction to reduce or remove redundancy inherent in video sequences. For block-based video coding, a video frame or slice may be partitioned into blocks. Each block can be further partitioned. Blocks in an intra-coded (I) frame or slice are encoded using spatial prediction with respect to reference samples in neighboring blocks in the same frame or slice. Blocks in an inter-coded (P or B) frame or slice may use spatial prediction with respect to reference samples in neighboring blocks in the same frame or slice or temporal prediction with respect to reference samples in other reference frames. Spatial or temporal prediction results in a predictive block for a block to be coded. Residual data represents pixel differences between the original block to be coded and the predictive block.

An inter-coded block is encoded according to a motion vector that points to a block of reference samples forming the predictive block, and the residual data indicating the difference between the coded block and the predictive block. An intra-coded block is encoded according to an intra-coding mode and the residual data. For further compression, the residual data may be transformed from the pixel domain to a transform domain, resulting in residual transform coefficients, which then may be quantized. The quantized transform coefficients, initially arranged in a two-dimensional array, may be scanned in a particular order to produce a one-dimensional vector of transform coefficients for entropy coding.

SUMMARY

In general, this disclosure describes techniques for coding video data. This disclosure describes techniques for performing sample adaptive offset signaling and coding in a video coding process. Techniques of the disclosure include both a merge-based and prediction-based signaling process for sample adaptive offset information (i.e., offset values and offset type).

In one example of the disclosure, a method for encoding sample adaptive offset values in a video encoding process is proposed. The method includes determining offset information for a current partition, comparing the offset information of the current partition with offset information of one or more neighbor partitions, coding a merge instruction in the case that the offset information of one of the one or more neighbor partitions is the same as the offset information of the current partition, and coding one of a plurality of prediction instructions in the case that the offset information of the one or more neighbor partitions is not the same as the offset information of the current partition.

In another example of the disclosure, an apparatus configured to encode sample adaptive offset values in a video coding process is proposed. The apparatus includes a video encoder configured to compare offset information of a current partition with offset information of one or more neighbor partitions, code a merge instruction in the case that the offset information of one of the one or more neighbor partitions is the same as the offset information of the current partition, and code one of a plurality of prediction instructions in the case that the offset information of the one or more neighbor partitions is not the same as the offset information of the current partition.

In another example of the disclosure, a method for decoding sample adaptive offset values in a video decoding process is proposed. The method includes receiving, for a current partition, a merge instruction or one of a plurality of prediction instructions, copying offset information from a neighbor partition to the current partition in the case that the merge instruction is received, and performing an offset prediction process for the current partition in the case that one of the plurality of prediction instructions is received.

In another example of the disclosure, an apparatus configured to decode sample adaptive offset values in a video decoding process is proposed. The apparatus includes a video decoder configured to receive, for a current partition, a merge instruction or one of a plurality of prediction instructions, copy offset information from a neighbor partition to the current partition in the case that the merge instruction is received, and perform an offset prediction process for the current partition in the case that one of the plurality of prediction instructions is received.

The details of one or more examples are set forth in the accompanying drawings and the description below. Other features, objects, and advantages will be apparent from the description and drawings, and from the claims.

BRIEF DESCRIPTION OF DRAWINGS

FIG. 2 is a conceptual diagram showing the four possible edge offset types.

DETAILED DESCRIPTION

In general, this disclosure describes techniques for coding video data. This disclosure describes techniques for coding sample adaptive offset values in a video coding process.

Digital video devices implement video compression techniques to encode and decode digital video information more efficiently. Video compression may apply spatial (intra-frame) prediction and/or temporal (inter-frame) prediction techniques to reduce or remove redundancy inherent in video sequences.

For video coding according to the high efficiency video coding (HEVC) standard currently under development by the Joint Cooperative Team for Video Coding (JCT-VC), as one example, a video frame may be partitioned into coding units. A coding unit (CU) generally refers to an image region that serves as a basic unit to which various coding tools are applied for video compression. A CU usually has a luminance component, denoted as Y, and two chroma components, denoted as U and V. Depending on the video sampling format, the size of the U and V components, in terms of number of samples, may be the same as or different from the size of the Y component. A CU is typically square, and may be considered to be similar to a so-called macroblock, e.g., under other video coding standards such as ITU-T H.264. Coding according to some of the presently proposed aspects of the developing HEVC standard will be described in this application for purposes of illustration. However, the techniques described in this disclosure may be useful for other video coding processes, such as those defined according to H.264 or other standard or proprietary video coding processes.

HEVC standardization efforts are based on a model of a video coding device referred to as the HEVC Test Model (HM). The HM presumes several capabilities of video coding devices over devices according to, e.g., ITU-T H.264/AVC. For example, whereas H.264 provides nine intra-prediction encoding modes, HM provides as many as thirty-four intra-prediction encoding modes.

According to the HM, a CU may include one or more prediction units (PUs) and/or one or more transform units (TUs). Syntax data within a bitstream may define a largest coding unit (LCU), which is a largest CU in terms of the number of pixels. In general, a CU has a similar purpose to a macroblock of H.264, except that a CU does not have a size distinction. Thus, a CU may be split into sub-CUs. In general, references in this disclosure to a CU may refer to a largest coding unit of a picture or a sub-CU of an LCU. An LCU may be split into sub-CUs, and each sub-CU may be further split into sub-CUs. Syntax data for a bitstream may define a maximum number of times an LCU may be split, referred to as CU depth. Accordingly, a bitstream may also define a smallest coding unit (SCU). This disclosure also uses the term "block" or "portion" to refer to any of a CU, PU, or TU. In general, "portion" may refer to any sub-set of a video frame.

Figure 1:
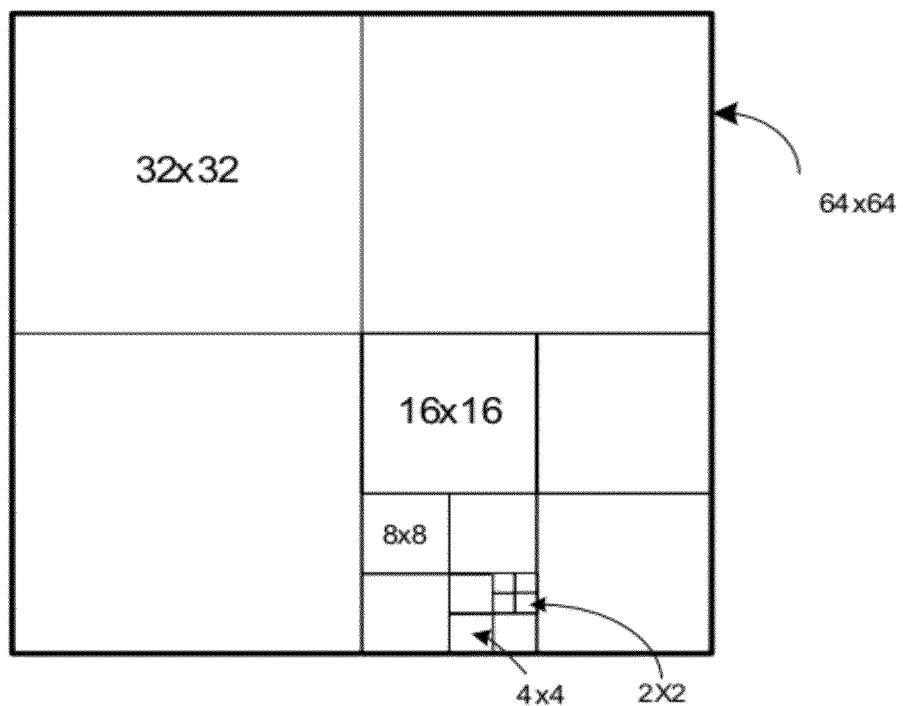
FIG. 1 is a conceptual diagram depicting a quadtree structure for coding units in a video coding process.

An LCU may be associated with a quadtree data structure. FIG. 1 is a conceptual diagram of a quadtree splitting. In general, a quadtree data structure includes one node per CU, where a root node corresponds to the LCU. If a CU is split into four sub-CUs, the node corresponding to the CU includes four leaf nodes, each of which corresponds to one of the sub-CUs. Each node of the quadtree data structure may provide syntax data for the corresponding CU. For example, a node in the quadtree may include a split flag, indicating whether the CU corresponding to the node is split into sub-CUs. Syntax elements for a CU may be defined recursively, and may depend on whether the CU is split into sub-CUs. If a CU is not split further, it is referred as a leaf-CU. In this disclosure, 4 sub-CUs of a leaf-CU will also be referred to as leaf-CUs although there is no explicit splitting of the original leaf-CU. For example if a CU at 16×16 size is not split further, the four 8×8 sub-CUs will also be referred to as leaf-CUs although the 16×16 CU was never split.

Moreover, TUs of leaf-CUs may also be associated with respective quadtree data structures. That is, a leaf-CU may include a quadtree indicating how the leaf-CU is partitioned into TUs. This disclosure refers to the quadtree indicating how an LCU is partitioned as a CU quadtree and the quadtree indicating how a leaf-CU is partitioned into TUs as a TU quadtree. The root node of a TU quadtree generally corresponds to a leaf-CU, while the root node of a CU quadtree generally corresponds to an LCU. TUs of the TU quadtree that are not split are referred to as leaf-TUs.

A leaf-CU may include one or more prediction units (PUs). In general, a PU represents all or a portion of the corresponding CU, and may include data for retrieving a reference sample for the PU. For example, when the PU is inter-mode encoded, the PU may include data defining a motion vector for the PU. The data defining the motion vector may describe, for example, a horizontal component of the motion vector, a vertical component of the motion vector, a resolution for the motion vector (e.g., one-quarter pixel precision or one-eighth pixel precision), a reference frame to which the motion vector points, and/or a reference list (e.g., list 0 or list 1) for the motion vector. Data for the leaf-CU defining the PU(s) may also describe, for example, partitioning of the CU into one or more PUs. Partitioning modes may differ depending on whether the CU is uncoded, intra-prediction mode encoded, or inter-prediction mode encoded. For intra coding, a PU may be treated the same as a leaf transform unit described below.

Sample adaptive offset (SAO) coding is currently under consideration for adoption into the HEVC standard. In general, the addition of offset values to pixels in a video frame (e.g., a predictive frame for inter-prediction or intra-prediction) may improve coding during illumination changes between frames of a video sequence, e.g., such as during flashes, a darkening sky, or other types of illumination changes between frames. For example, offset values may be applied to pixels of a predicted video block in order to bias the values of the predictive video block so as to compensate for illumination changes. Previous video coding standards, such as H.264, applied offset types and values uniformly across entire blocks or frames of pixels. SAO techniques allow for different offset values to be applied to different pixels (or blocks) depending on pixel (or block) classification metrics. Possible classification metrics include activity metrics such as edge metrics and band metrics. A description of offset classifications can be found in C. M. Fu, C. Y. Chen, C. Y. Tsai, Y. W. Huang, S. Lei, "CE13: Sample Adaptive Offset with LCU-Independent Decoding", JCT-VC Contribution, E049, Geneva, Feb 2011.

In the current SAO implementation in the working draft of the HEVC standard, each partition (which consists of a set of LCUs) can have one of three offset types (also called pixel classification): no offset, band classification based offset type 0/1, and edge classification based type 0/1/2/3. Each band classification offset type has 16 possible offset values, while each edge classification based type has 4 possible offset values. If one of these offset types is chosen to be used for the partition, information indicating the corresponding offset type and the offset values are sent to the decoder.

Figure 2:
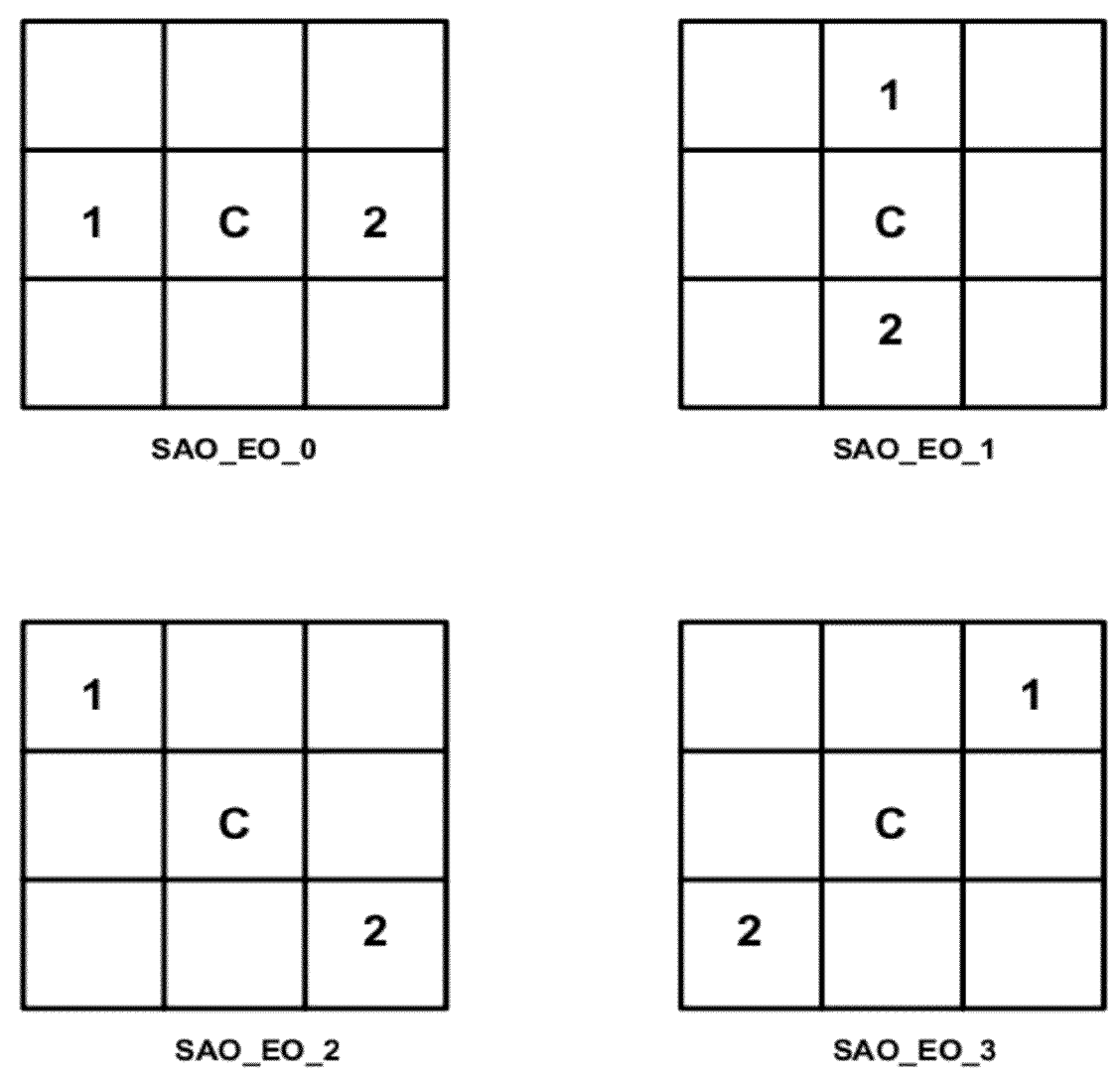

The edge offset type classifies each pixel based on edge information. FIG. 2 is a conceptual diagram showing the four possible edge offset classifications (also called offset types) currently proposed for HEVC. An edge for a current pixel C is determined relative to two neighboring pixels (1 and 2). Edge offset type 0 (SAO_EO_0) is a horizontal edge. Edge offset type 1 (SAO_EO_1) is a vertical edge. Edge offset types 2 (SAO_EO_2) and 3 (SAO_EO_3) are diagonal edges. For each edge offset type value, four offset values are determined and signaled in the encoded video bitstream for use by a decoder.

Figure 3:
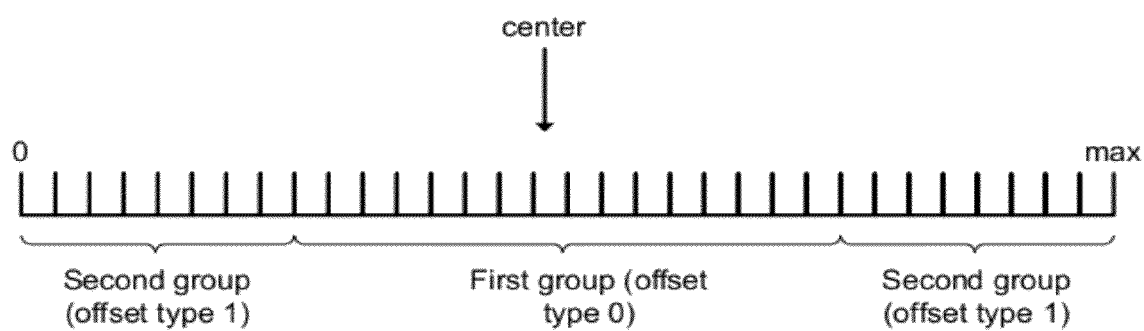
FIG. 3 is a conceptual diagram showing example band offset types.

For band offset, pixels are classified into different bands based on intensity. FIG. 3 is a conceptual diagram showing example bands based on intensity value. For band offset classification, pixels are categorized into 32 bands. The 16 bands in the center are classified into one group (band offset type 0) and the remaining bands are classified into a second group (band offset type 1). For each group of bands, 16 offset values are determined and are signaled in the encoded video bitstream for use by a video decoder.

This disclosure proposes methods and techniques to more efficiently send offset type and offset values for each partition. In this context, a partition may include multiple coding units (CUs) (similar to so-called macroblocks in the H.264 standard) or even multiple largest coding units (LCUs).

In one example of the disclosure, techniques for encoding sample adaptive offset values in a video encoding process are proposed. The proposed techniques include determining offset information for a current partition, comparing the offset information of the current partition with offset information of one or more neighbor partitions, coding a merge instruction in the case that the offset information of one of the one or more neighbor partitions is the same as the offset information of the current partition, and coding one of a plurality of prediction instructions in the case that the offset information of the one or more neighbor partitions is not the same as the offset information of the current partition.

In another example of the disclosure, techniques for decoding sample adaptive offset values in a video decoding process are proposed. The proposed techniques include receiving, for a current partition, a merge instruction or one of a plurality of prediction instructions, copying offset information from a neighbor partition to the current partition in the case that the merge instruction is received, and performing an offset prediction process for the current partition in the case that one of the plurality of prediction instructions is received.

Figure 4:
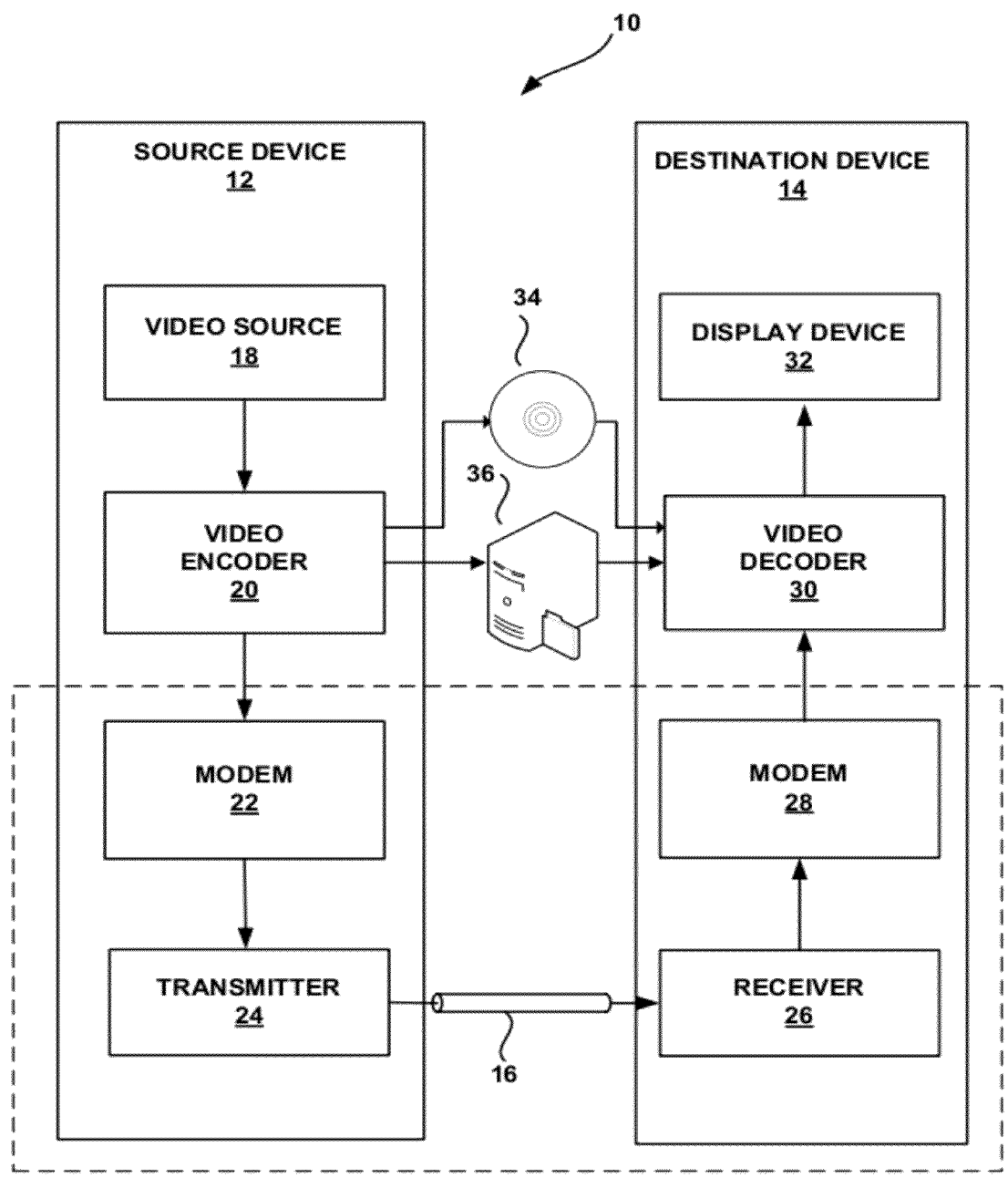
FIG. 4 is a block diagram illustrating an example video encoding and decoding system.

FIG. 4 is a block diagram illustrating an example video encoding and decoding system 10 that may be configured to utilize techniques for performing sample adaptive offset signaling and coding in accordance with examples of this disclosure. As shown in FIG. 4, the system 10 includes a source device 12 that transmits encoded video to a destination device 14 via a communication channel 16. Encoded video data may also be stored on a storage medium 34 or a file server 36 and may be accessed by the destination device 14 as desired. When stored to a storage medium or file server, video encoder 20 may provide coded video data to another device, such as a network interface, a compact disc (CD), Blu-ray or digital video disc (DVD) burner or stamping facility device, or other devices, for storing the coded video data to the storage medium. Likewise, a device separate from video decoder 30, such as a network interface, CD or DVD reader, or the like, may retrieve coded video data from a storage medium and provided the retrieved data to video decoder 30.

The source device 12 and the destination device 14 may comprise any of a wide variety of devices, including desktop computers, notebook (i.e., laptop) computers, tablet computers, set-top boxes, telephone handsets such as so-called smartphones, televisions, cameras, display devices, digital media players, video gaming consoles, or the like. In many cases, such devices may be equipped for wireless communication. Hence, the communication channel 16 may comprise a wireless channel, a wired channel, or a combination of wireless and wired channels suitable for transmission of encoded video data. Similarly, the file server 36 may be accessed by the destination device 14 through any standard data connection, including an Internet connection. This may include a wireless channel (e.g., a Wi-Fi connection), a wired connection (e.g., DSL, cable modem, etc.), or a combination of both that is suitable for accessing encoded video data stored on a file server.

Techniques for performing sample adaptive offset signaling and coding, in accordance with examples of this disclosure, may be applied to video coding in support of any of a variety of multimedia applications, such as over-the-air television broadcasts, cable television transmissions, satellite television transmissions, streaming video transmissions, e.g., via the Internet, encoding of digital video for storage on a data storage medium, decoding of digital video stored on a data storage medium, or other applications. In some examples, the system 10 may be configured to support one-way or two-way video transmission to support applications such as video streaming, video playback, video broadcasting, and/or video telephony.

In the example of FIG. 4, the source device 12 includes a video source 18, a video encoder 20, a modulator/demodulator 22 and a transmitter 24. In the source device 12, the video source 18 may include a source such as a video capture device, such as a video camera, a video archive containing previously captured video, a video feed interface to receive video from a video content provider, and/or a computer graphics system for generating computer graphics data as the source video, or a combination of such sources. As one example, if the video source 18 is a video camera, the source device 12 and the destination device 14 may form so-called camera phones or video phones. However, the techniques described in this disclosure may be applicable to video coding in general, and may be applied to wireless and/or wired applications, or application in which encoded video data is stored on a local disk.

The captured, pre-captured, or computer-generated video may be encoded by the video encoder 20. The encoded video information may be modulated by the modem 22 according to a communication standard, such as a wireless communication protocol, and transmitted to the destination device 14 via the transmitter 24. The modem 22 may include various mixers, filters, amplifiers or other components designed for signal modulation. The transmitter 24 may include circuits designed for transmitting data, including amplifiers, filters, and one or more antennas.

The captured, pre-captured, or computer-generated video that is encoded by the video encoder 20 may also be stored onto a storage medium 34 or a file server 36 for later consumption. The storage medium 34 may include Blu-ray discs, DVDs, CD-ROMs, flash memory, or any other suitable digital storage media for storing encoded video. The encoded video stored on the storage medium 34 may then be accessed by the destination device 14 for decoding and playback.

The file server 36 may be any type of server capable of storing encoded video and transmitting that encoded video to the destination device 14. Example file servers include a web server (e.g., for a website), an FTP server, network attached storage (NAS) devices, a local disk drive, or any other type of device capable of storing encoded video data and transmitting it to a destination device. The transmission of encoded video data from the file server 36 may be a streaming transmission, a download transmission, or a combination of both. The file server 36 may be accessed by the destination device 14 through any standard data connection, including an Internet connection. This may include a wireless channel (e.g., a Wi-Fi connection), a wired connection (e.g., DSL, cable modem, Ethernet, USB, etc.), or a combination of both that is suitable for accessing encoded video data stored on a file server.

The destination device 14, in the example of FIG. 4, includes a receiver 26, a modem 28, a video decoder 30, and a display device 32. The receiver 26 of the destination device 14 receives information over the channel 16, and the modem 28 demodulates the information to produce a demodulated bitstream for the video decoder 30. The information communicated over the channel 16 may include a variety of syntax information generated by the video encoder 20 for use by the video decoder 30 in decoding video data. Such syntax may also be included with the encoded video data stored on the storage medium 34 or the file server 36. Each of the video encoder 20 and the video decoder 30 may form part of a respective encoder-decoder (CODEC) that is capable of encoding or decoding video data. In this disclosure, the term coder refers to an encoder, a decoder, or CODEC, and the terms coder, encoder, decoder and CODEC all refer to specific machines designed for the coding (encoding and/or decoding) of video data consistent with this disclosure.

The display device 32 may be integrated with, or external to, the destination device 14. In some examples, the destination device 14 may include an integrated display device and also be configured to interface with an external display device. In other examples, the destination device 14 may be a display device. In general, the display device 32 displays the decoded video data to a user, and may comprise any of a variety of display devices such as a liquid crystal display (LCD), a plasma display, an organic light emitting diode (OLED) display, or another type of display device.

In the example of FIG. 4, the communication channel 16 may comprise any wireless or wired communication medium, such as a radio frequency (RF) spectrum or one or more physical transmission lines, or any combination of wireless and wired media. The communication channel 16 may form part of a packet-based network, such as a local area network, a wide-area network, or a global network such as the Internet. The communication channel 16 generally represents any suitable communication medium, or collection of different communication media, for transmitting video data from the source device 12 to the destination device 14, including any suitable combination of wired or wireless media. The communication channel 16 may include routers, switches, base stations, or any other equipment that may be useful to facilitate communication from the source device 12 to the destination device 14.

The video encoder 20 and the video decoder 30 may operate according to a video compression standard, such as the High Efficiency Video Coding (HEVC) standard presently under development, and may conform to the HEVC Test Model (HM). Alternatively, the video encoder 20 and the video decoder 30 may operate according to other proprietary or industry standards, such as the ITU-T H.264 standard, alternatively referred to as MPEG-4, Part 10, Advanced Video Coding (AVC), or extensions of such standards. The techniques of this disclosure, however, are not limited to any particular coding standard. Other examples include MPEG-2 and ITU-T H.263.

Although not shown in FIG. 4, in some aspects, the video encoder 20 and the video decoder 30 may each be integrated with an audio encoder and decoder, and may include appropriate MUX-DEMUX units, or other hardware and software, to handle encoding of both audio and video in a common data stream or separate data streams. If applicable, in some examples, MUX-DEMUX units may conform to the ITU H.223 multiplexer protocol, or other protocols such as the user datagram protocol (UDP).

The video encoder 20 and the video decoder 30 each may be implemented as any of a variety of suitable encoder circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Each of the video encoder 20 and the video decoder 30 may be included in one or more encoders or decoders, either of which may be integrated as part of a combined encoder/decoder (CODEC) in a respective device.

The video encoder 20 may implement any or all of the techniques of this disclosure for performing sample adaptive offset signaling and coding in a video encoding process. Likewise, the video decoder 30 may implement any or all of these techniques for performing sample adaptive offset coding in a video coding process. A video coder, as described in this disclosure, may refer to a video encoder or a video decoder. Similarly, a video coding unit may refer to a video encoder or a video decoder. Likewise, video coding may refer to video encoding or video decoding.

In one example of the disclosure, the video encoder 20 of the source device 12 may be configured to compare offset information of a current partition with offset information of one or more neighbor partitions, code a merge instruction in the case that the offset information of one of the one or more neighbor partitions is the same as the offset information of the current partition, and code one of a plurality of prediction instructions in the case that the offset information of the one or more neighbor partitions is not the same as the offset information of the current partition.

In another example of the disclosure, the video decoder 30 of the destination device 14 may be configured to receive, for a current partition, a merge instruction or one of a plurality of prediction instructions, copy offset information from a neighbor partition to the current partition in the case that the merge instruction is received, perform an offset prediction process for the current partition in the case that one of the plurality of prediction instructions is received.

Figure 5:
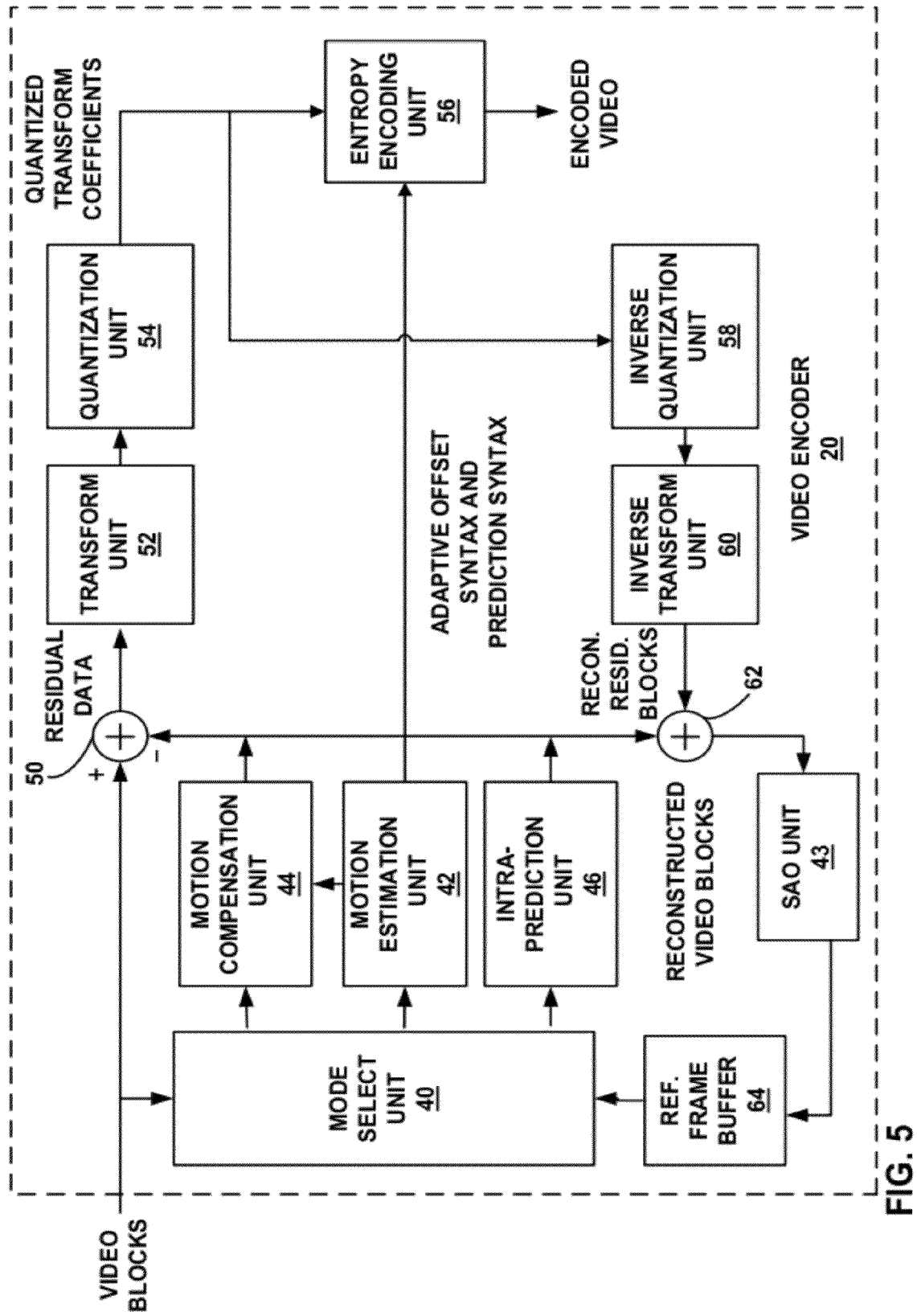
FIG. 5 is a block diagram illustrating an example video encoder.

FIG. 5 is a block diagram illustrating an example of a video encoder 20 that may use techniques for coding and signaling sample adaptive offset values as described in this disclosure. The video encoder 20 will be described in the context of HEVC coding for purposes of illustration, but without limitation of this disclosure as to other coding standards or methods that may require scanning of transform coefficients. The video encoder 20 may perform intra- and inter-coding of CUs within video frames. Intra-coding relies on spatial prediction to reduce or remove spatial redundancy in video data within a given video frame. Inter-coding relies on temporal prediction to reduce or remove temporal redundancy between a current frame and previously coded frames of a video sequence. Intra-mode (I-mode) may refer to any of several spatial-based video compression modes. Inter-modes such as uni-directional prediction (P-mode) or bi-directional prediction (B-mode) may refer to any of several temporal-based video compression modes.

As shown in FIG. 5, the video encoder 20 receives a current video block within a video frame to be encoded. In the example of FIG. 5, the video encoder 20 includes a motion compensation unit 44, a motion estimation unit 42, an intra-prediction unit 46, a reference frame buffer 64, a summer 50, a transform unit 52, a quantization unit 54, and an entropy encoding unit 56. The transform unit 52 illustrated in FIG. 5 is the unit that applies the actual transform or combinations of transform to a block of residual data, and is not to be confused with block of transform coefficients, which also may be referred to as a transform unit (TU) of a CU. For video block reconstruction, the video encoder 20 also includes an inverse quantization unit 58, an inverse transform unit 60, a summer 62, and an SAO unit 43. A deblocking filter may also be included to filter block boundaries to remove blockiness artifacts from reconstructed video. If desired, the deblocking filter would typically filter the output of the summer 62.

During the encoding process, the video encoder 20 receives a video frame or slice to be coded. The frame or slice may be divided into multiple video blocks, e.g., largest coding units (LCUs). The motion estimation unit 42 and the motion compensation unit 44 perform inter-predictive coding of the received video block relative to one or more blocks in one or more reference frames to provide temporal compression. The intra-prediction unit 46 may perform intra-predictive coding of the received video block relative to one or more neighboring blocks in the same frame or slice as the block to be coded to provide spatial compression.

The mode select unit 40 may select one of the coding modes, intra or inter, e.g., based on rate distortion results for each mode, and provides the resulting intra- or inter-predicted block (e.g., a prediction unit (PU)) to the summer 50 to generate residual block data and to the summer 62 to reconstruct the encoded block for use in a reference frame. Summer 62 combines the predicted block with inverse quantized, inverse transformed data from inverse transform unit 60 for the block to reconstruct the encoded block, as described in greater detail below. Some video frames may be designated as I-frames, where all blocks in an I-frame are encoded in an intra-prediction mode. In some cases, the intra-prediction unit 46 may perform intra-prediction encoding of a block in a P- or B-frame, e.g., when motion search performed by the motion estimation unit 42 does not result in a sufficient prediction of the block.

The motion estimation unit 42 and the motion compensation unit 44 may be highly integrated, but are illustrated separately for conceptual purposes. Motion estimation (or motion search) is the process of generating motion vectors, which estimate motion for video blocks. A motion vector, for example, may indicate the displacement of a prediction unit in a current frame relative to a reference sample of a reference frame. The motion estimation unit 42 calculates a motion vector for a prediction unit of an inter-coded frame by comparing the prediction unit to reference samples of a reference frame stored in the reference frame buffer 64. A reference sample may be a block that is found to closely match the portion of the CU including the PU being coded in terms of pixel difference, which may be determined by sum of absolute difference (SAD), sum of squared difference (SSD), or other difference metrics. The reference sample may occur anywhere within a reference frame or reference slice, and not necessarily at a block (e.g., coding unit) boundary of the reference frame or slice. In some examples, the reference sample may occur at a fractional pixel position.

The motion estimation unit 42 sends the calculated motion vector to the entropy encoding unit 56 and the motion compensation unit 44. The portion of the reference frame identified by a motion vector may be referred to as a reference sample. The motion compensation unit 44 may calculate a prediction value for a prediction unit of a current CU, e.g., by retrieving the reference sample identified by a motion vector for the PU.

The intra-prediction unit 46 may intra-predict the received block, as an alternative to inter-prediction performed by the motion estimation unit 42 and the motion compensation unit 44. The intra-prediction unit 46 may predict the received block relative to neighboring, previously coded blocks, e.g., blocks above, above and to the right, above and to the left, or to the left of the current block, assuming a left-to-right, top-to-bottom encoding order for blocks. The intra-prediction unit 46 may be configured with a variety of different intra-prediction modes. For example, the intra-prediction unit 46 may be configured with a certain number of directional prediction modes, e.g., thirty-five directional prediction modes, based on the size of the CU being encoded.

The intra-prediction unit 46 may select an intra-prediction mode by, for example, calculating error values for various intra-prediction modes and selecting a mode that yields the lowest error value. Directional prediction modes may include functions for combining values of spatially neighboring pixels and applying the combined values to one or more pixel positions in a PU. Once values for all pixel positions in the PU have been calculated, the intra-prediction unit 46 may calculate an error value for the prediction mode based on pixel differences between the PU and the received block to be encoded. The intra-prediction unit 46 may continue testing intra-prediction modes until an intra-prediction mode that yields an acceptable error value is discovered. The intra-prediction unit 46 may then send the PU to the summer 50.

The video encoder 20 forms a residual block by subtracting the prediction data calculated by the motion compensation unit 44 or the intra-prediction unit 46 from the original video block being coded. The summer 50 represents the component or components that perform this subtraction operation. The residual block may correspond to a two-dimensional matrix of pixel difference values, where the number of values in the residual block is the same as the number of pixels in the PU corresponding to the residual block. The values in the residual block may correspond to the differences, i.e., error, between values of co-located pixels in the PU and in the original block to be coded. The differences may be chroma or luma differences depending on the type of block that is coded.

The transform unit 52 may form one or more transform units (TUs) from the residual block. The transform unit 52 selects a transform from among a plurality of transforms. The transform may be selected based on one or more coding characteristics, such as block size, coding mode, or the like. The transform unit 52 then applies the selected transform to the TU, producing a video block comprising a two-dimensional array of transform coefficients. The transform unit 52 may select the transform partition according to above-described techniques of this disclosure. In addition, the transform unit 52 may signal the selected transform partition in the encoded video bitstream.

The transform unit 52 may send the resulting transform coefficients to the quantization unit 54. The quantization unit 54 may then quantize the transform coefficients. The entropy encoding unit 56 may then perform a scan of the quantized transform coefficients in the matrix according to a scanning mode. This disclosure describes the entropy encoding unit 56 as performing the scan. However, it should be understood that, in other examples, other processing units, such as the quantization unit 54, could perform the scan.

Once the transform coefficients are scanned into the one-dimensional array, the entropy encoding unit 56 may apply entropy coding such as CAVLC, CABAC, syntax-based context-adaptive binary arithmetic coding (SBAC), or another entropy coding methodology to the coefficients.

To perform CAVLC, the entropy encoding unit 56 may select a variable length code for a symbol to be transmitted. Codewords in VLC may be constructed such that relatively shorter codes correspond to more likely symbols, while longer codes correspond to less likely symbols. In this way, the use of VLC may achieve a bit savings over, for example, using equal-length codewords for each symbol to be transmitted.

To perform CABAC, the entropy encoding unit 56 may select a context model to apply to a certain context to encode symbols to be transmitted. The context may relate to, for example, whether neighboring values are non-zero or not. The entropy encoding unit 56 may also entropy encode syntax elements, such as the signal representative of the selected transform. In accordance with the techniques of this disclosure, the entropy encoding unit 56 may select the context model used to encode these syntax elements based on, for example, an intra-prediction direction for intra-prediction modes, a scan position of the coefficient corresponding to the syntax elements, block type, and/or transform type, among other factors used for context model selection.

Following the entropy coding by the entropy encoding unit 56, the resulting encoded video may be transmitted to another device, such as the video decoder 30, or archived for later transmission or retrieval.

In some cases, the entropy encoding unit 56 or another unit of the video encoder 20 may be configured to perform other coding functions, in addition to entropy coding. For example, the entropy encoding unit 56 may be configured to determine coded block pattern (CBP) values for CU's and PU's. Also, in some cases, the entropy encoding unit 56 may perform run length coding of coefficients.

The inverse quantization unit 58 and the inverse transform unit 60 apply inverse quantization and inverse transformation, respectively, to reconstruct the residual block in the pixel domain, e.g., for later use as a reference block. The motion compensation unit 44 may calculate a reference block by adding the residual block to a predictive block of one of the frames of the reference frame buffer 64. The motion compensation unit 44 may also apply one or more interpolation filters to the reconstructed residual block to calculate sub-integer pixel values for use in motion estimation. The summer 62 adds the reconstructed residual block to the motion compensated prediction block produced by the motion compensation unit 44 to produce a reconstructed video block.

The SAO unit 43 determines offset type and offset values for a current partition and adds offset values to the pixels of the reconstructed video block (i.e., the current partition) and signals adaptive offset syntax in the encoded video bitstream for use by a decoder. The reconstructed video block with offset values is then stored in the reference frame buffer 64. The reconstructed video block may be used by the motion estimation unit 42 and the motion compensation unit 44 as a reference block to inter-code a block in a subsequent video frame.

In some cases, offset information (i.e., offset type and offset values) is signaled in the encoded video bitstream by sending them as they are, i.e., without prediction or reference to other partitions. However, this technique fails to make use of possible correlations between different partitions, which can be exploited in the coding of offset type and offset values for increased efficiency. This disclosure proposes the following techniques take advantage of the potential correlations to code offset type and values.

Initially, it is determined if the offset type and offset values are applied at the slice level or at the partition level. That is to say, the encoder may choose whether a whole slice has one offset type and offset value (slice based) or whether each partition has its own offset type and values (partition based). If slice based offset is chosen, offset type and offset values are sent to the decoder with no prediction, in which case the offset values may be sent in a slice-level syntax (e.g., the slice header) and used for CUs within that slice. Otherwise, if partition based offsets are selected, the encoder may employ merge-based or prediction-based signaling of offset information.

SAO unit 43 may signal a merge instruction in the encoded video bitstream that instructs a decoder to simply copy the offset type and values from a neighbor partition for the current partition. Alternatively, the SAO unit 43 may signal a prediction instruction in the encoded video bitstream that instructs a decode to apply a prediction technique to determine the offset type and offset values for the current partition (no merge).

Figure 6:
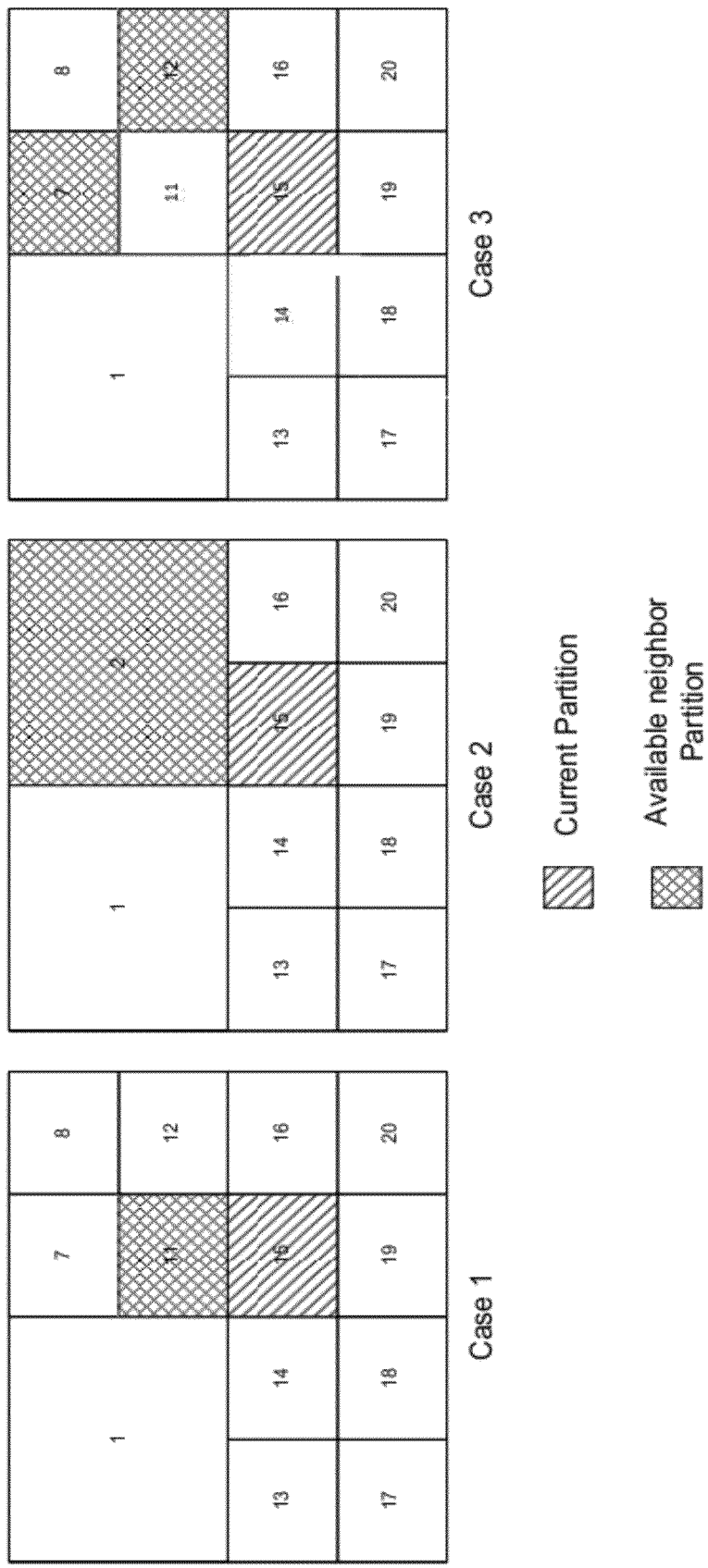
FIG. 6 is a conceptual diagram depicting potential neighbor partitions used in signaling offset information.

Both merge-based and prediction-based signaling of offset information for a current partition may relay on the offset information of neighboring partitions relative to the current partition. FIG. 6 is a conceptual diagram depicting potential neighbor partitions used in signaling offset information. Neighbor partitions are usually derived in the causal fashion (i.e., neighbor partitions that have already been decoded by the decoder). Examples of locations of neighbor partition include the upper (U), left (L), upper left (UL), and upper right (UR) partitions relative to the current partition. Neighbor partitions may be directly adjacent the current partition. In another example, neighbor partitions may be further away from the current partition, but in the same coding unit (e.g., within the same LCU).

Neighbor partitions that are potential merge candidates are available (i.e., causal) neighbor partitions with the same offset type. For example, if the current partition's offset type is edge offset type 0 (EO0), causal neighbor partitions with offset type EO0 are considered to be merge candidates.

Different cases may apply when determining available neighbor partitions when quad-tree based partitioning is used. FIG. 6 shows a case 1 where the direct (i.e., adjacent) neighbor partition of the same size has the same offset type. In case 2, the parent of the neighbor has the same offset type (i.e., a partition of larger size than the current partition). In case 3, the direct neighbor partition of the same size does not have the same offset type, but a neighbor partition of the direct neighbor partition does have the same offset type. Each of these three cases shows examples of neighbor partitions that may be used for the sample adaptive offset merge mode.

After determining the offset type and offset values for a current partition, the SAO unit 43 compares the offset type and offset values of the current partition to the neighbor partitions. Merge-mode is used when one of the neighbor partitions has the same offset type and offset values as the current partition.

Figure 7A:
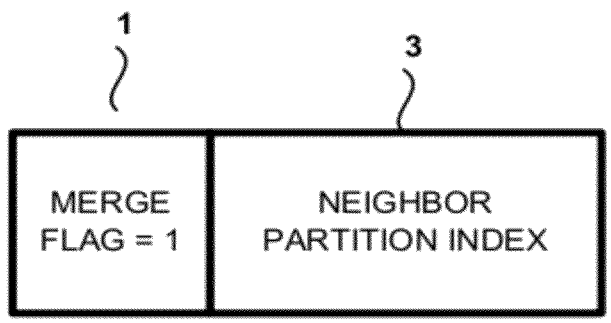
FIG. 7A is a conceptual diagram of an example of adaptive offset syntax coding in a merge mode.

FIG. 7A is a conceptual diagram of an example of adaptive offset syntax coding in a merge mode. A "merge" flag 1 (e.g., 1 for merge and 0 for no merge, or vice versa) is signaled in the encoded video bitstream to indicate whether the decoder should copy a neighboring partition's offset type and offset values for the current partition (i.e., perform a merge process). Note that the merge flag can be inferred to be 0 (i.e., no merge) when there is no available neighbor with offset enabled.

If merge is used (i.e., merge flag set to 1), in addition to the merge flag 1, the SAO unit 43 signals a neighbor partition index 3 to the decoder which indicates the index of the neighbor partition whose offset information (i.e., offset type and values) will be copied to the current partition during video decoding. The signaling of the neighbor partition index depends on the number of different available neighbor partitions (also called merge candidates). The neighbor partition index may not be sent when there is only one merge candidate. In that situation, the decoder may infer the index of the only merge candidate.

If the SAO unit 43 compares the offset information of the current partition to all of the neighbor partitions and does not find an exact match, merge is not used. If no merge is used, (i.e., merge flag set to 0), a prediction type is sent to the decoder (e.g., using a pred_type flag). This disclosure proposes three possible prediction types.

Figure 7B:
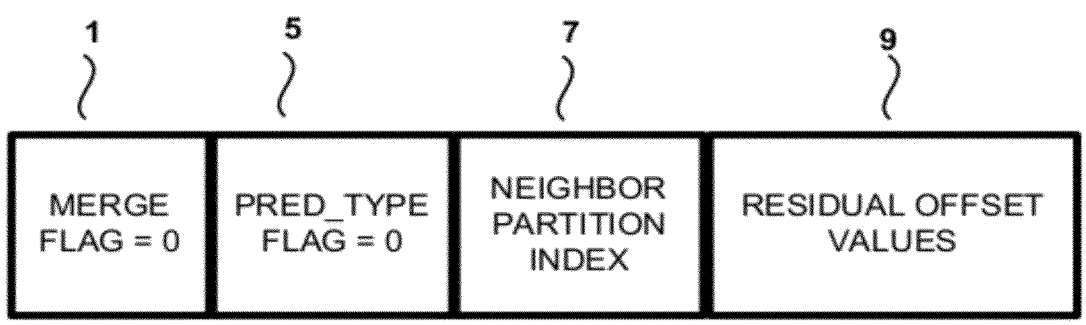
FIG. 7B is a conceptual diagram of an example of adaptive offset syntax coding in a first prediction mode.

FIG. 7B is a conceptual diagram of an example of adaptive offset syntax coding in a first prediction mode. A first prediction instruction may be sent (i.e., pred_type 0) is the case that the SAO unit 43 determines that the offset values of a neighbor partition are not identical to those of the current partition, but are close enough so that bit rate efficiencies can be achieved by sending the residual offset values. The use of pred_type 0 may be determined by comparing the bit rate achieved by sending residual offset values as compared to the bit rate from sending the offset values of the current partition as is.

For the first prediction instruction, a pred_type flag 5 is set to 0. The neighbor partition index 7 is the index of the predictive neighbor partition. Like merge mode, pred_type 0 uses neighbor partitions that have the same offset type of the current partition. A decoder may simply copy the offset type for the current partition from the neighbor partition during the decoding process. Residual offset values 9 are also signaled in the encoded video bitstream. The residual offset values are created by subtracting the offset values determined for the current partition, from the offset values of the selected neighbor partition. A decoder may then simply add the received residual offset values to the offset values of the neighbor partition indicated by the neighbor partition index 7 to reconstruct the offset values for the current partition. Neighbor partitions that are available as prediction candidates may be derived in the same way as for merge mode described above with reference to FIG. 6. If there is only one available neighbor partition, neighbor partition index may not be signaled, but instead may be inferred by the decoder.

Figure 7C:
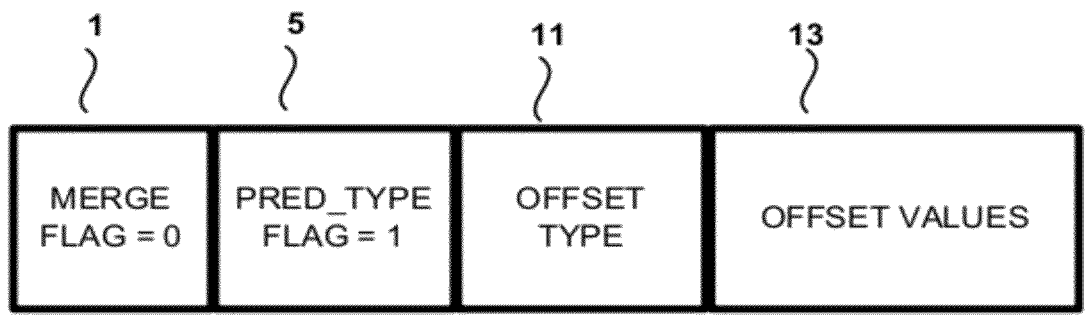
FIG. 7C is a conceptual diagram of an example of adaptive offset syntax coding in a second prediction mode.

In situations where no neighbor partition has offset values close enough to those of the current partition to achieve coding efficiencies by sending the residual, a second prediction instruction (pred_type 1) can be signaled in the encoded video bitstream. FIG. 7C is a conceptual diagram of an example of adaptive offset syntax coding in a second prediction mode. In pred_type 1, both the offset type 11 and offset values 13 for the current partition are signaled in the encoded bitstream as is. Essentially, the decoder need not reference any neighbor partition in this mode, but may simply receive the offset type and offset values for the current partition.

Figure 7D:
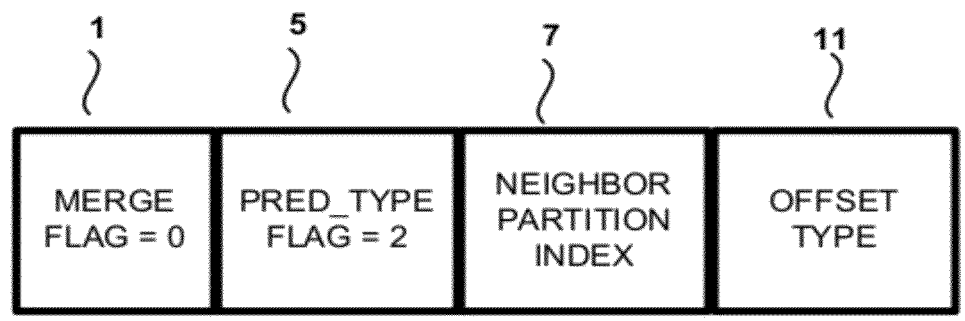
FIG. 7D is a conceptual diagram of an example of adaptive offset syntax coding in a third prediction mode.

A third prediction instruction (pred_type 2) may be sent in situations where the SAO unit 43 determines that the current partition's offset values are the same as a neighboring partition, but the offset type is different. FIG. 7D is a conceptual diagram of an example of adaptive offset syntax coding in a third prediction mode. In this case, the neighbor partition index 7 indicates the neighboring partition from which to copy offset values for the current partition. In addition, the offset type 11 for the current partition is also signaled in the encoded video bitstream. Note that this differs slightly from the merge flag, as only the offset values are copied from a neighbor partition and not the offset type. The derivation of prediction candidates for prediction type 2 is slightly different than that for prediction type 0 and merge mode. Instead of considering causal neighbors with the same offset type, prediction type 2 considers neighbor partitions with different offset types. For example, if the current partition's offset type is edge offset type 0 (EO0), neighbors with EO1/2/3 are considered to be prediction candidates.

Figure 8:
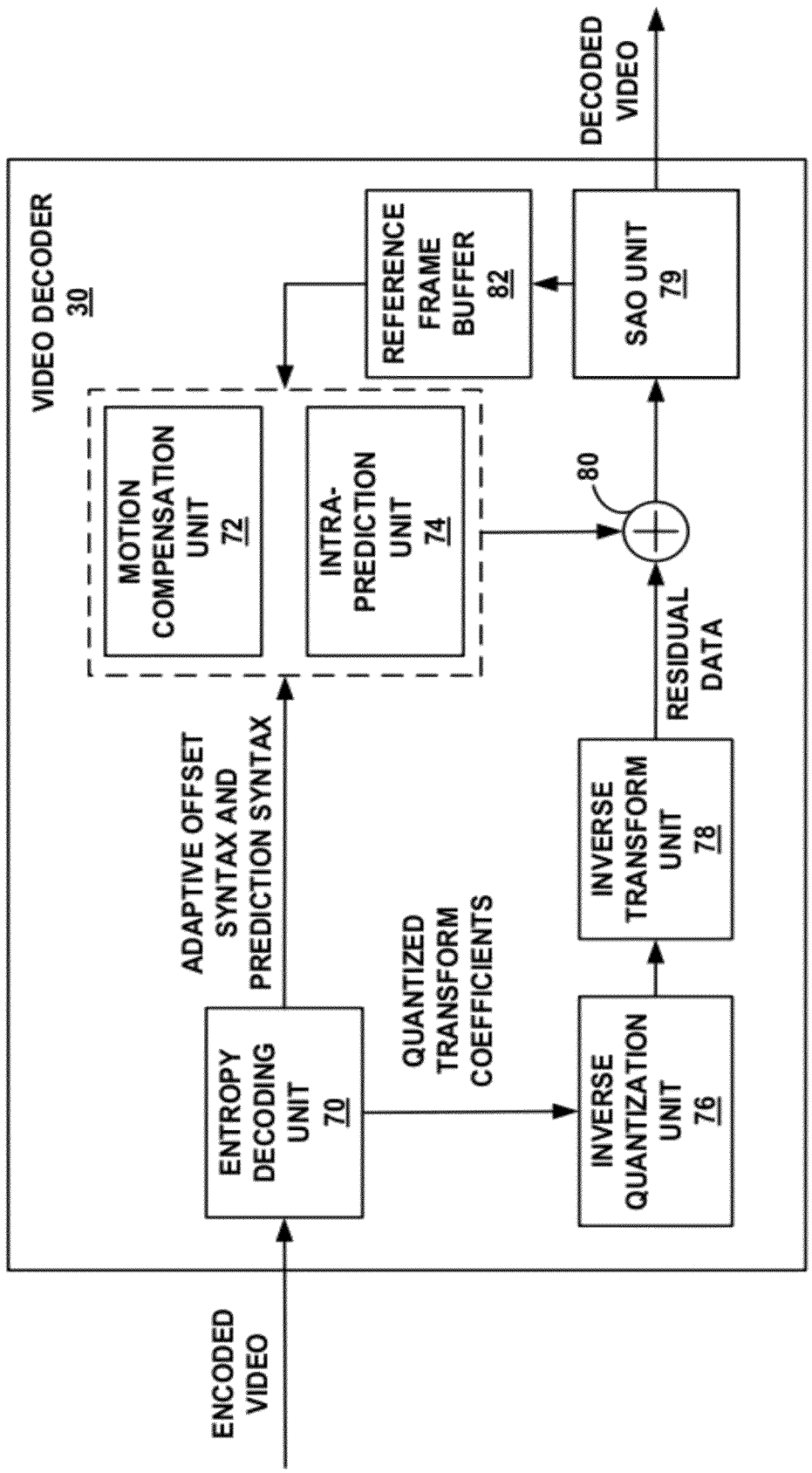
FIG. 8 is a block diagram illustrating an example video decoder.

FIG. 8 is a block diagram illustrating an example of a video decoder 30, which decodes an encoded video sequence. In the example of FIG. 8, the video decoder 30 includes an entropy decoding unit 70, a motion compensation unit 72, an intra-prediction unit 74, an inverse quantization unit 76, an inverse transformation unit 78, a reference frame buffer 82, a SAO unit 79, and a summer 80. The video decoder 30 may, in some examples, perform a decoding pass generally reciprocal to the encoding pass described with respect to the video encoder 20 (see FIG. 5).

The entropy decoding unit 70 performs an entropy decoding process on the encoded bitstream to retrieve a one-dimensional array of transform coefficients. The entropy decoding process used depends on the entropy coding used by the video encoder 20 (e.g., CABAC, CAVLC, etc.). The entropy coding process used by the encoder may be signaled in the encoded bitstream or may be a predetermined process.

In some examples, the entropy decoding unit 70 (or the inverse quantization unit 76) may scan the received values using a scan mirroring the scanning mode used by the entropy encoding unit 56 (or the quantization unit 54) of the video encoder 20. Although the scanning of coefficients may be performed in the inverse quantization unit 76, scanning will be described for purposes of illustration as being performed by the entropy decoding unit 70. In addition, although shown as separate functional units for ease of illustration, the structure and functionality of the entropy decoding unit 70, the inverse quantization unit 76, and other units of the video decoder 30 may be highly integrated with one another.

The inverse quantization unit 76 inverse quantizes, i.e., de-quantizes, the quantized transform coefficients provided in the bitstream and decoded by the entropy decoding unit 70. The inverse quantization process may include a conventional process, e.g., similar to the processes proposed for HEVC or defined by the H.264 decoding standard. The inverse quantization process may include use of a quantization parameter QP calculated by the video encoder 20 for the CU to determine a degree of quantization and, likewise, a degree of inverse quantization that should be applied. The inverse quantization unit 76 may inverse quantize the transform coefficients either before or after the coefficients are converted from a one-dimensional array to a two-dimensional array.

The inverse transform unit 78 applies an inverse transform to the inverse quantized transform coefficients. In some examples, the inverse transform unit 78 may determine an inverse transform based on signaling from the video encoder 20, or by inferring the transform from one or more coding characteristics such as block size, coding mode, or the like. In some examples, the inverse transform unit 78 may determine a transform to apply to the current block based on a signaled transform at the root node of a quadtree for an LCU including the current block. Alternatively, the transform may be signaled at the root of a TU quadtree for a leaf-node CU in the LCU quadtree. In some examples, the inverse transform unit 78 may apply a cascaded inverse transform, in which inverse transform unit 78 applies two or more inverse transforms to the transform coefficients of the current block being decoded.

The intra-prediction unit 74 may generate prediction data for a current block of a current frame based on a signaled intra-prediction mode and data from previously decoded blocks of the current frame.

Based on the retrieved motion prediction direction, reference frame index, and calculated current motion vector, the motion compensation unit produces a motion compensated block for the current portion. These motion compensated blocks essentially recreate the predictive block used to produce the residual data.

The motion compensation unit 72 may produce the motion compensated blocks, possibly performing interpolation based on interpolation filters. Identifiers for interpolation filters to be used for motion estimation with sub-pixel precision may be included in the syntax elements. The motion compensation unit 72 may use interpolation filters as used by the video encoder 20 during encoding of the video block to calculate interpolated values for sub-integer pixels of a reference block. The motion compensation unit 72 may determine the interpolation filters used by the video encoder 20 according to received syntax information and use the interpolation filters to produce predictive blocks.

Additionally, the motion compensation unit 72 and the intra-prediction unit 74, in an HEVC example, may use some of the syntax information (e.g., provided by a quadtree) to determine sizes of LCUs used to encode frame(s) of the encoded video sequence. The motion compensation unit 72 and the intra-prediction unit 74 may also use syntax information to determine split information that describes how each CU of a frame of the encoded video sequence is split (and likewise, how sub-CUs are split). The syntax information may also include modes indicating how each split is encoded (e.g., intra- or inter-prediction, and for intra-prediction an intra-prediction encoding mode), one or more reference frames (and/or reference lists containing identifiers for the reference frames) for each inter-encoded PU, and other information to decode the encoded video sequence.

The summer 80 combines the residual blocks with the corresponding prediction blocks generated by the motion compensation unit 72 or the intra-prediction unit 74 to form decoded blocks. The SAO unit 79 than removes the offset introduced by the encoder. The SAO unit 79 performs this process according to received syntax that indicates the offset information for a partition, such as the syntax described above with reference to FIGS. 7A-D.

If a merge instruction is received, the SAO unit 79 copies offset information to the current partition from the neighbor partition indicated by the neighbor partition index 3 (see FIG. 7A).

If a first prediction instruction (pred_type 0) is received, the SAO unit 79 copies the offset type to the current partition from the neighbor partition indicated by the neighbor partition index 7 (see FIG. 7B). In addition, the SAO unit 79 adds the received residual offset values 9 to the offset values of the neighbor partition index indicated by the neighbor partition index 7 to reconstruct offset values for the current partition (see FIG. 7B).

If a second prediction instruction (pred_type 1) is received, the SAO unit 79 uses the received offset type 11 and offset values 13 as the offset information for the current partition (see FIG. 7C).

If a third prediction instruction (pred_type 2) is received, the SAO unit 79 copies to the current partition the offset values from the neighbor partition indicated by the neighbor partition index 7 (see FIG. 7D). In addition, the SAO unit 79 uses the received offset type 11 as the offset type for the current partition.

If desired, a deblocking filter may also be applied to filter the decoded blocks in order to remove blockiness artifacts. Additional filtering may also be applied either in-loop or post-loop. The decoded video blocks are then stored in the reference frame buffer 82, which provides reference blocks for subsequent motion compensation and also produces decoded video for presentation on a display device (such as the display device 32 of FIG. 4). If in-loop filtering is applied, the decoded video blocks stored for subsequent motion compensation are filtered blocks, but if post-loop filtering is applied, the decoded video blocks stored for subsequent motion compensation are unfiltered blocks.

Figure 9:
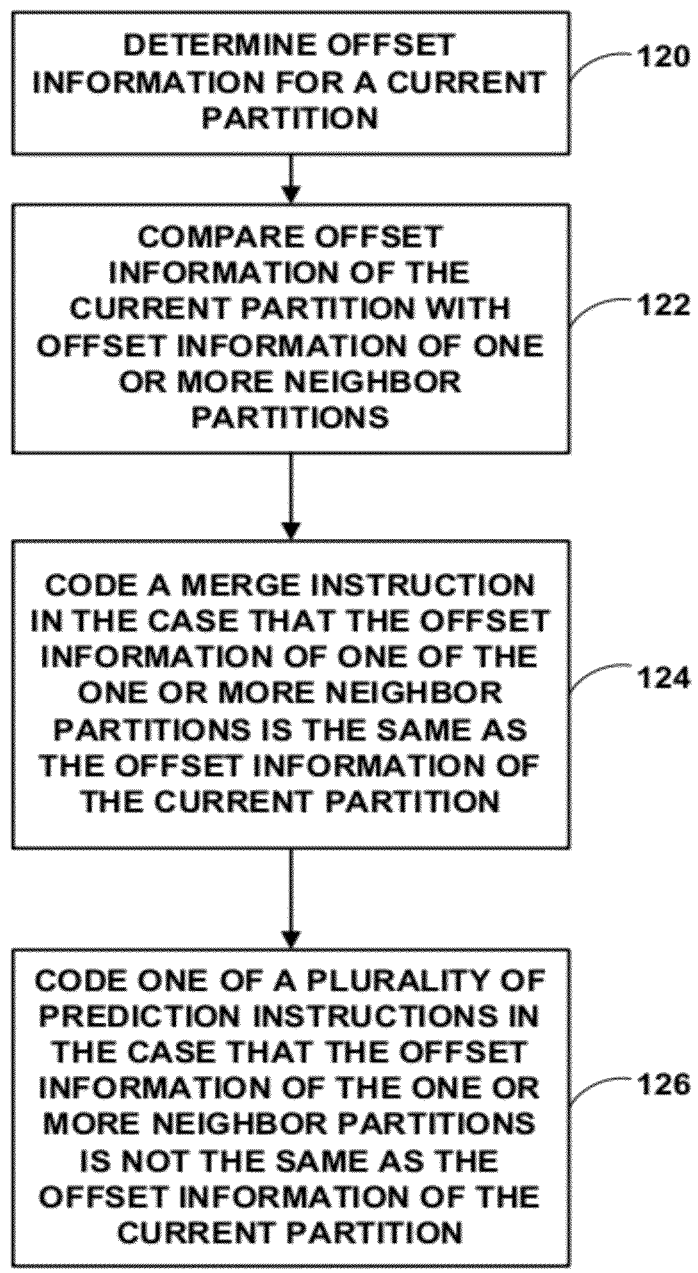
FIG. 9 is a flowchart illustrating an example method of encoding video using sample adaptive offset.

FIG. 9 is a flowchart illustrating an example method of encoding video using sample adaptive offset. The method of FIG. 9 is described from the perspective of video encoder 20 shown in FIG. 5, although other devices may perform the techniques of FIG. 9. As shown in FIG. 9, the video encoder 20 may be configured to encode sample adaptive offset values in a video encoding process. The video encoder 20 may determine offset information for a current partition (120) and compare the offset information of the current partition with offset information of one or more neighbor partitions (122). Offset information may include an offset type and offset values. The video encoder 20 codes a merge instruction in the case that the offset information of one of the one or more neighbor partitions is the same as the offset information of the current partition (124). The video encoder 20 codes one of a plurality of prediction instructions in the case that the offset information of the one or more neighbor partitions is not the same as the offset information of the current partition (124).

The merge instruction instructs a decoder to copy the offset information of one of the one or more neighbor partitions for the current partition. The merge instruction may include a merge flag and an index of the one of the one or more neighbor partitions with the same offset information as the current partition.

In one example, coding one of a plurality of prediction instructions may include coding a first prediction instruction which instructs a decoder to derive offset information for the current partition from offset information of one of the one or more neighbor partitions. The first prediction instruction may include an index of one of the one or more neighbor partitions and offset residual values, and wherein offset residual values are created by subtracting the offset values of the current partition from offset values of one of the one or more neighbor partitions. The video encoder 20 may code the first prediction in the case that bit rate efficiencies may be achieved by send offset residual values.

In another example, coding one of a plurality of prediction instructions includes coding a second prediction instruction which includes offset information for the current partition. The video encoder 20 may code the second prediction instruction in the case that no bit rate efficiencies may be achieved by sending offset residual values.

In another example, coding one of a plurality of prediction instructions includes coding a third prediction instruction which includes an index of one of the one or more neighbor partitions from which to copy offset values and also includes an offset type for the current partition.

Figure 10:
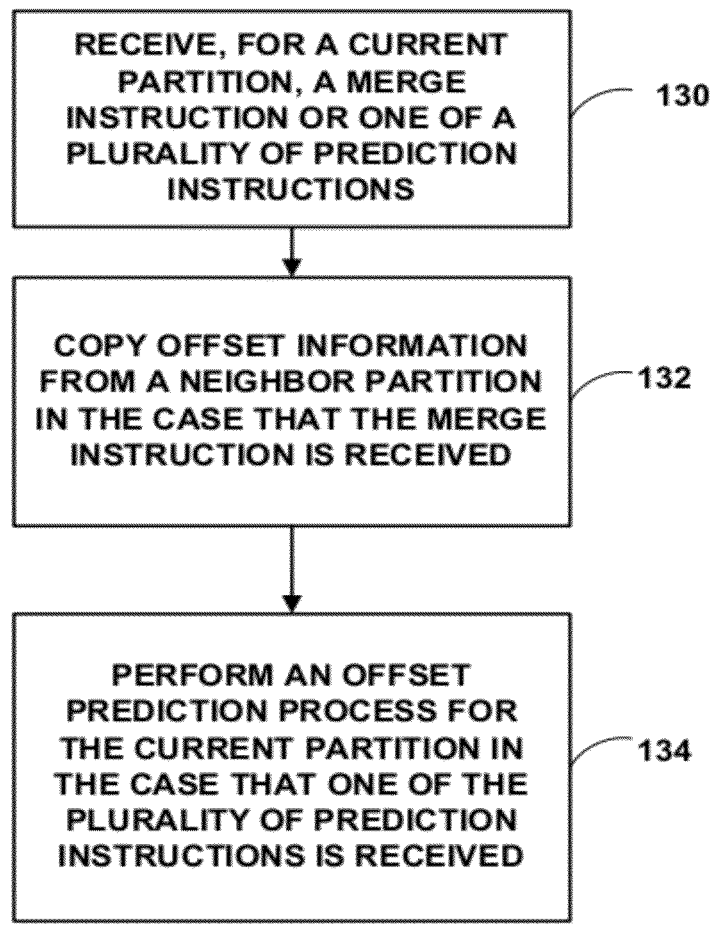
FIG. 10 is a flowchart illustrating an example method of decoding video using sample adaptive offset.

FIG. 10 is a flowchart illustrating an example method of decoding video using sample adaptive offset. The method of FIG. 10 is described from the perspective of the video decoder 30 shown in FIG. 8, although other devices may perform the techniques of FIG. 10. As shown in FIG. 10, the video decoder 30 may be configured to decode sample adaptive offset values in a video decoding process. The video decoder may be configured to receive, for a current partition, a merge instruction or one of a plurality of prediction instructions (130). The video decoder is configured to copy offset information from a neighbor partition to the current partition in the case that the merge instruction is received (132). The merge instruction includes a merge flag and an index of the neighbor partition. The offset information may include an offset type and offset values.

The video decoder is also configured to perform an offset prediction process for the current partition in the case that one of the plurality of prediction instructions is received (134).

The plurality of prediction instructions may include a first, second, and third prediction instruction. In the case that the first prediction instruction is received, the offset prediction process derives offset information for the current partition from offset information of one of the one or more neighbor partitions. The first prediction instruction may include an index of one of the one or more neighbor partitions and offset residual values. The video decoder 20 derives offset values for the current partition by adding offset values of the one neighbor partition to the offset residual values.

In the case that the second prediction instruction is received, the video decoder 20 also receives the offset information. The received offset information is used for the current partition.

In the case that the third prediction instruction is received, the video decoder 20 also receives an index of one of the one or more neighbor partitions from which to copy offset values and also receives an offset type. The video decoder 20 performs the offset prediction process by deriving offset information for the current partition by copying offset values from the one neighbor partition for the current partition and by assigning the received offset type to the current partition.

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method for encoding sample adaptive offset information in a video encoding process performed by a video encoding apparatus, the method comprising:
   determining sample adaptive offset information for a current partition of video data;
   comparing the sample adaptive offset information of the current partition with sample adaptive offset information of one or more neighbor partitions of the video data; and
   encoding a merge syntax element indicating that a video decoder is to copy the sample adaptive offset information for the current partition from sample adaptive offset information of one of the one or more neighbor partitions in the case that the offset information of the one of the one or more neighbor partitions is the same as the offset information of the current partition.

2. The method of claim 1, wherein the sample adaptive offset information includes an offset type and offset values.

3. The method of claim 1, wherein the merge syntax element includes a merge flag that instructs the video decoder to copy the sample adaptive offset information of the one of the one or more neighbor partitions for the current partition.

4. The method of claim 1, wherein the merge syntax element includes a plurality of syntax elements, the plurality of syntax elements comprising a merge flag and an index of the one of the one or more neighbor partitions from which to copy the sample adaptive offset information for the current partition.

5. The method of claim 2, further comprising:
encoding one of a plurality of prediction syntax elements in a case that the sample adaptive offset information of one of the one or more neighbor partitions is not the same as the sample adaptive offset information of the current partition, wherein encoding one of a plurality of prediction instructions includes:
encoding a first prediction instruction which instructs the video decoder to derive the sample adaptive offset information for the current partition from sample adaptive offset information of one of the one or more neighbor partitions.

6. The method of claim 5, wherein the first prediction instruction includes an index of one of the one or more neighbor partitions and offset residual values, and wherein the offset residual values are created by subtracting the offset values of the current partition from offset values of one of the one or more neighbor partitions.

7. The method of claim 6, wherein the first prediction instruction is encoded in the case that bit rate efficiencies may be achieved by sending offset residual values.

8. The method of claim 2, wherein encoding one of a plurality of prediction instructions includes:
encoding a second prediction instruction which includes sample adaptive offset information for the current partition.

9. The method of claim 8, wherein the second prediction instruction is encoded in the case that no bit rate efficiencies may be achieved by sending offset residual values.

10. The method of claim 2, wherein encoding one of a plurality of prediction instructions includes:
encoding a third prediction instruction which includes an index of one of the one or more neighbor partitions from which to copy offset values and also includes an offset type for the current partition.

11. An apparatus configured to encode sample adaptive offset information in a video coding process, the apparatus comprising:
a memory configured to store video data
a video encoder configured to:
determine sample adaptive offset information for a current partition of the video data;
compare the sample adaptive offset information of the current partition with sample adaptive offset information of one or more neighbor partitions of the video data; and
encode a merge syntax element indicating that a video decoder is to copy the sample adaptive offset information for the current partition from the sample adaptive offset information of one of the one or more neighbor partitions in the case that the offset information of one of the one or more neighbor partitions is the same as the offset information of the current partition.

12. The apparatus of claim 11, wherein the sample adaptive offset information includes an offset type and offset values.

13. The apparatus of claim 11, wherein the merge syntax element includes a merge flag that instructs the video decoder to copy the sample adaptive offset information of the one of the one or more neighbor partitions for the current partition.

14. The apparatus of claim 11, wherein the merge syntax element includes a plurality of syntax elements, the plurality of syntax elements comprising a merge flag and an index of one of the one or more neighbor partitions.

15. The apparatus of claim 12, wherein the video encoder is further configured to:
encode one of a plurality of prediction syntax elements in a case that the sample adaptive offset information of one of the one or more neighbor partitions is not the same as the offset information of the current partition, wherein encoding one of a plurality of prediction instructions includes:
encoding a first prediction instruction which instructs the video decoder to derive sample adaptive offset information for the current partition from sample adaptive offset information of one of the one or more neighbor partitions.

16. The apparatus of claim 15, wherein the first prediction instruction includes an index of one of the one or more neighbor partitions and offset residual values, and wherein the offset residual values are created by subtracting the offset values of the current partition from offset values of one of the one or more neighbor partitions.

17. The apparatus of claim 16, wherein the video encoder is configured to encode the first prediction instruction in the case that bit rate efficiencies may be achieved by sending offset residual values.

18. The apparatus of claim 12, wherein the video encoder is further configured to encode a second prediction instruction which includes sample adaptive offset information for the current partition.

19. The apparatus of claim 18, wherein the video encoder is configured to encode the second prediction instruction in the case that no bit rate efficiencies may be achieved by sending offset residual values.

20. The apparatus of claim 12, wherein the video encoder is further configured to encode a third prediction instruction which includes an index of one of the one or more neighbor partitions from which to copy offset values and also includes an offset type for the current partition.

21. An apparatus for encoding sample adaptive offset information in a video encoding process, the apparatus comprising:
means for determining sample adaptive offset information for a current partition of video data;
means for comparing sample adaptive offset information of the current partition with sample adaptive offset information of one or more neighbor partitions, wherein the sample adaptive offset information includes an offset type and offset values; and
means for encoding a merge syntax element indicating that a video decoder is to copy the sample adaptive offset information for the current partition from the sample adaptive offset information of one of the one or more neighbor partitions in the case that the offset information of one of the one or more neighbor partitions is the same as the offset information of the current partition.

22. The apparatus of claim 21, wherein the merge syntax element includes a merge flag that instructs the video decoder to copy the sample adaptive offset information of the one of the one or more neighbor partitions for the current partition.

23. The apparatus of claim 21, further comprising:
means for encoding one of a plurality of prediction syntax elements in the case that the sample adaptive offset information of one of the one or more neighbor partitions is not the same as the sample adaptive offset information of the current partition, wherein the means for encoding one of a plurality of prediction instructions includes:
means for encoding a first prediction instruction which instructs the video decoder to derive the sample adaptive offset information for the current partition from sample adaptive offset information of one of the one or more neighbor partitions, and wherein the first prediction instruction includes an index of one of the one or more neighbor partitions and offset residual values, and wherein the offset residual values are created by subtracting the offset values of the current partition from offset values of one of the one or more neighbor partitions.

24. The apparatus of claim 21, further comprising:
means for encoding a second prediction instruction which includes sample adaptive offset information for the current partition, wherein the second prediction instruction is encoded in the case that no bit rate efficiencies may be achieved by sending offset residual values.

25. The apparatus of claim 21, further comprising:
means for encoding a third prediction instruction which includes an index of one of the one or more neighbor partitions from which to copy offset values and also includes an offset type for the current partition.

26. A computer program product comprising a non-transitory computer-readable storage medium having stored thereon instructions that, when executed, cause a processor of a device for encoding video data to:
determine sample adaptive offset information for a current partition of video data;
compare the sample adaptive offset information of the current partition with sample adaptive offset information of one or more neighbor partitions of the video data; and
encode a merge syntax element indicating that a video decoder is to copy the sample adaptive offset information for the current partition from the sample adaptive offset information of one of the one or more neighbor partitions in the case that the offset information of one of the one or more neighbor partitions is the same as the offset information of the current partition.

27. The computer program product of claim 26, wherein the sample adaptive offset information includes an offset type and offset values.

28. The computer program product of claim 26, wherein the instructions further cause a processor to:
encode one of a plurality of prediction syntax elements in the case that the sample adaptive offset information of one of the one or more neighbor partitions is not the same as the offset information of the current partition, wherein coding one of a plurality of prediction instructions includes:
encoding a first prediction instruction which instructs a decoder to derive sample adaptive offset information for the current partition from sample adaptive offset information of one of the one or more neighbor partitions, and wherein the first prediction instruction includes an index of one of the one or more neighbor partitions and offset residual values, and wherein the offset residual values are created by subtracting the offset values of the current partition from offset values of one of the one or more neighbor partitions.

29. The computer program product of claim 26, further causing a processor to:
encode a second prediction instruction which includes sample adaptive offset information for the current partition, wherein the second prediction instruction is encoded in the case that no bit rate efficiencies may be achieved by sending offset residual values.

30. The computer program product of claim 26, further causing a processor to:
encode a third prediction instruction which includes an index of one of the one or more neighbor partitions from which to copy offset values and also includes an offset type for the current partition.

31. A method for decoding sample adaptive offset information in a video decoding process performed by a video decoder, the method comprising:
receiving, for a current partition of video data, a merge syntax element indicating that sample adaptive offset information for the current partition is to be copied from a neighbor partition;
copying sample adaptive offset information for the current partition from the neighbor partition in the case that the merge syntax element is received; and
performing a sample adaptive offset process for the current partition using the copied sample adaptive offset information.

32. The method of claim 31, wherein the sample adaptive offset information includes an offset type and offset values.

33. The method of claim 31, wherein the merge syntax element includes a plurality of syntax elements, the plurality of syntax elements comprising a merge flag and an index of the neighbor partition.

34. The method of claim 32, further comprising receiving a prediction instruction for a second partition, and deriving sample adaptive offset information for the second partition from sample adaptive offset information of one of the one or more neighbor partitions in response to the prediction instruction.

35. The method of claim 34, wherein the sample adaptive offset information includes an offset type and offset values, and wherein the prediction instruction includes an index of one of one or more neighbor partitions and offset residual values, the method further comprising deriving offset values of the sample adaptive offset information for the second partition by adding offset values of the one of the one or more neighbor partitions to the offset residual values.

36. The method of claim 32, further comprising receiving a prediction instruction for a second partition, wherein the prediction instruction includes sample adaptive offset information for the second partition.

37. The method of claim 32, wherein the sample adaptive offset information includes an offset type and offset values, the method further comprising receiving a prediction instruction for a second partition, wherein the prediction instruction includes an index of one of one or more neighbor partitions from which to copy offset values and also includes an offset type for the second partition, and deriving sample adaptive offset information for the second partition by copying offset values from the one of the one or more neighbor partitions for the second partition and by assigning the received offset type to the second partition.

38. An apparatus configured to decode sample adaptive offset information in a video decoding process comprising:
a memory configured to store video data;
a video decoder configured to:
receive, for a current partition of the video data, a merge syntax element indicating that sample adaptive offset information for the current partition is to be copied from a neighbor partition;
copy sample adaptive offset information for the current partition from the neighbor partition in the case that the merge syntax element is received; and
perform a sample adaptive offset process for the current partition using the copied sample adaptive offset information.

39. The apparatus of claim 38, wherein the sample adaptive offset information includes an offset type and offset values.

40. The apparatus of claim 38, wherein the merge syntax element includes a plurality of merge syntax elements, the plurality of merge syntax elements comprising a merge flag and an index of the neighbor partition.

41. The apparatus of claim 39, wherein the video decoder is configured to receive a first prediction instruction for a second partition, and derive sample adaptive offset information for the second partition from sample adaptive offset information of one of one or more neighbor partitions in response to the prediction instruction.

42. The apparatus of claim 41, wherein the sample adaptive offset information includes an offset type and offset values, and wherein the first prediction instruction includes an index of one of one or more neighbor partitions and offset residual values, the video decoder being configured to derive offset values of the sample adaptive offset information for the second partition by adding offset values of the one of the one or more neighbor partitions to the offset residual values.

43. The apparatus of claim 39, wherein the video decoder is configured to receive a prediction instruction for a second partition, and wherein the prediction instruction includes sample adaptive offset information for the second partition.

44. The apparatus of claim 39, wherein the sample adaptive offset information includes an offset type and offset values, the video decoder being configured to receive prediction instruction for a second partition, wherein the prediction instruction includes an index of one of one or more neighbor partitions from which to copy offset values and also includes an offset type for the second partition, and derive sample adaptive information for the second partition by copying offset values from the one of the one or more neighbor partitions for the second partition and by assigning the received offset type to the second partition.

45. An apparatus configured to decode sample adaptive offset information in a video decoding process, the apparatus comprising:
means for receiving, for a current partition of video data, a merge syntax element indicating that sample adaptive offset information for the current partition is to be copied from a neighbor partition;
means for copying sample adaptive offset information for the current partition from the neighbor partition in the case that the merge syntax element is received; and
means for performing a sample adaptive offset process for the current partition using the copied sample adaptive offset information.

46. A computer program product comprising a non-transitory computer-readable storage medium having stored thereon instructions that, when executed, cause a processor of a device for decoding video data to:
receive, for a current partition of video data, a merge syntax element indicating that sample adaptive offset information for the current partition is to be copied from a neighbor partition;
copy sample adaptive offset information for the current partition from the neighbor partition in the case that the merge syntax element is received; and
perform a sample adaptive offset process for the current partition using the copied sample adaptive offset information.

47. The method of claim 1, wherein the merge syntax element comprises a merge flag that instructs the video decoder to copy the sample adaptive offset information of the one of the one or more neighbor partitions for the current partition, and wherein the sample adaptive information comprises an offset type and offset values.

48. The method of claim 1, further comprising obtaining the video data with a video camera.

49. The method of claim 1, wherein the sample adaptive information comprises an offset type and offset values, the method further comprising performing a sample adaptive offset process that comprises applying the offset values to pixels of the current partition.

50. The method of claim 49, wherein the sample adaptive offset process comprises applying different offset values to at least some of the pixels of the current partition.

51. The method of claim 1, wherein the merge syntax element comprises one or more syntax elements that indicate one of the one or more neighbor partitions from which the video decoder is to copy the sample adaptive offset information.

52. The apparatus of claim 11, wherein the merge syntax element comprises a merge flag that instructs the video decoder to copy the sample adaptive offset information of the one of the one or more neighbor partitions for the current partition, and wherein the sample adaptive information comprises an offset type and offset values.

53. The apparatus of claim 11, further comprising a camera configured to obtain the video data.

54. The apparatus of claim 11, wherein the sample adaptive information comprises an offset type and offset values, and wherein the video encoder is configured to perform a sample adaptive offset process that comprises applying the offset values to pixels of the current partition.

55. The apparatus of claim 54, wherein the sample adaptive offset process performed by the video encoder comprises applying different offset values to at least some of the pixels of the current partition.

56. The apparatus of claim 11, wherein the merge syntax element comprises one or more syntax elements that indicate one of the one or more neighbor partitions from which the video decoder is to copy the sample adaptive offset information.

57. The apparatus of claim 21, wherein the merge syntax element comprises a merge flag that instructs the video decoder to copy the sample adaptive offset information of the one of the one or more neighbor partitions for the current partition, and wherein the sample adaptive information comprises an offset type and offset values.

58. The apparatus of claim 21, further comprising a camera configured to obtain the video data.

59. The apparatus of claim 21, wherein the sample adaptive information comprises an offset type and offset values, the apparatus further comprising means for performing a sample adaptive offset process that comprises applying the offset values to pixels of the current partition.

60. The apparatus of claim 59, wherein the sample adaptive offset process comprises applying different offset values to at least some of the pixels of the current partition.

61. The apparatus of claim 21, wherein the merge syntax element comprises one or more syntax elements that indicate one of the one or more neighbor partitions from which the video decoder is to copy the sample adaptive offset information.

62. The computer program product of claim 26, wherein the merge syntax element comprises a merge flag that instructs the video decoder to copy the sample adaptive offset information of the one of the one or more neighbor partitions for the current partition, and wherein the sample adaptive information comprises an offset type and offset values.

63. The computer program product of claim 26, wherein the sample adaptive information comprises an offset type and offset values, and the instructions further cause the processor to perform a sample adaptive offset process that comprises applying the offset values to pixels of the current partition.

64. The computer program product of claim 63, wherein the sample adaptive offset process comprises applying different offset values to at least some of the pixels of the current partition.

65. The computer program product of claim 26, wherein the merge syntax element comprises one or more syntax elements that indicate one of the one or more neighbor partitions from which the video decoder is to copy the sample adaptive offset information.

66. The method of claim 31, wherein the merge syntax element comprises a merge flag that instructs the video decoder to copy the sample adaptive offset information of the neighbor partition for the current partition, and wherein the sample adaptive information comprises an offset type and offset values.

67. The method of claim 31, further comprising generating video from the video data and displaying the video on a display device.

68. The method of claim 31, wherein the sample adaptive information comprises an offset type and offset values, and wherein the sample adaptive offset process comprises applying the offset values to pixels of the current partition.

69. The method of claim 68, wherein the sample adaptive offset process comprises applying different offset values to at least some of the pixels of the current partition.

70. The method of claim 31, wherein the merge syntax element comprises one or more syntax elements that indicate the neighnor partition from one or more neighbor partitions from which the video decoder is to copy the sample adaptive offset information.

71. The apparatus of claim 38, wherein the merge syntax element comprises a merge flag that instructs the video decoder to copy the sample adaptive offset information of the neighbor partition for the current partition, and wherein the sample adaptive information comprises an offset type and offset values.

72. The apparatus of claim 38, further comprising a display device configured to display video generated video from the video data.

73. The apparatus of claim 38, wherein the sample adaptive information comprises an offset type and offset values, and wherein the sample adaptive offset process comprises applying the offset values to pixels of the current partition.

74. The apparatus of claim 73, wherein the sample adaptive offset process comprises applying different offset values to at least some of the pixels of the current partition.

75. The apparatus of claim 38, wherein the merge syntax element comprises one or more syntax elements that indicate the neighbor partition from one or more neighbor partitions from which the video decoder is to copy the sample adaptive offset information.

76. The apparatus of claim 45, wherein the merge syntax element comprises a merge flag that instructs the video decoder to copy the sample adaptive offset information of the neighbor partition for the current partition, and wherein the sample adaptive information comprises an offset type and offset values.

77. The apparatus of claim 45, further comprising means for generating video from the video data and means for displaying the video.

78. The apparatus of claim 45, wherein the sample adaptive information comprises an offset type and offset values, and wherein the sample adaptive offset process comprises applying the offset values to pixels of the current partition.

79. The apparatus of claim 78, wherein applying the offset values comprises applying different offset values to at least some of the pixels of the current partition.

80. The apparatus of claim 45, wherein the merge syntax element comprises one or more syntax elements that indicate the neighbor partition from one or more neighbor partitions from which the video decoder is to copy the sample adaptive offset information.

81. The computer program product of claim 46, wherein the merge syntax element comprises a merge flag that instructs the video decoder to copy the sample adaptive offset information of the neighbor partition for the current partition, and wherein the sample adaptive information comprises an offset type and offset values.

82. The computer program product of claim 46, further comprising instructions to cause the processor to generate video from the video data and display the video on a display device.

83. The computer program product of claim 46, wherein the sample adaptive information comprises an offset type and offset values, and wherein the sample adaptive offset process comprises applying the offset values to pixels of the current partition.

84. The computer program product of claim 83, wherein applying the offset values comprises applying different offset values to at least some of the pixels of the current partition.

85. The computer program product of claim 46, wherein the merge syntax element comprises one or more syntax elements that indicate the neighbor partition from one or more neighbor partitions from which the video decoder is to copy the sample adaptive offset information.

* * * * *